United States Patent [19]

Carre et al.

[11] Patent Number: 4,768,419
[45] Date of Patent: Sep. 6, 1988

[54] PNEUMATIC BRAKE BOOSTER

[75] Inventors: Jean-Jacques Carre, Le Raincy; Alain Thioux, Chennevieres, both of France

[73] Assignee: Bendix France, Drancy, France

[21] Appl. No.: 907,541

[22] Filed: Sep. 12, 1986

[30] Foreign Application Priority Data

Sep. 30, 1985 [FR] France .............................. 85 14452

[51] Int. Cl.⁴ .............................................. F15B 9/10
[52] U.S. Cl. ................................. 91/369.3; 91/376 R; 92/128
[58] Field of Search ............. 91/369 C, 369 A, 376 R; 92/13.1, 13.2, 13.6, 13, 26, 128

[56] References Cited

U.S. PATENT DOCUMENTS

| | | | |
|---|---|---|---|
| 3,082,744 | 3/1963 | Gardner | 91/369 A |
| 4,208,952 | 6/1980 | Ditlinger | 92/13.6 |
| 4,249,458 | 2/1981 | Massing | 92/13.6 |
| 4,453,380 | 6/1984 | Meynier | 92/13.2 |
| 4,508,009 | 4/1985 | Shimamura | 91/369 A |
| 4,525,999 | 7/1985 | Inman | 92/26 |
| 4,587,888 | 5/1986 | Anderson et al. | 92/13.6 |

FOREIGN PATENT DOCUMENTS 2561599 3/1984 France .
2084274 4/1982 United Kingdom .

Primary Examiner—Abraham Hershkovitz
Attorney, Agent, or Firm—Larry J. Palguta; Ken C. Decker

[57] ABSTRACT

The stop member (23), which forms a bearing surface (33) cooperating in abutment with an abutting member (22) carried by the actuating rod (13) of the booster so as to determine the operational dead travel of the booster, has a deformable structure (30) capable of yielding elastically when a pulling force (F) exerted axially by the abutting member (22) on the stop member exceeds a predetermined value. The deformable structure advantageously consists of at least one arm (30) integral with a mounting sleeve (28), fixed by crimping (37) onto the rear central duct (9) of the rear shell (2) of the booster housing. The abutting member (22) is secured, in a given position, to the coupling fork (15) of the actuating rod (13).

8 Claims, 3 Drawing Sheets

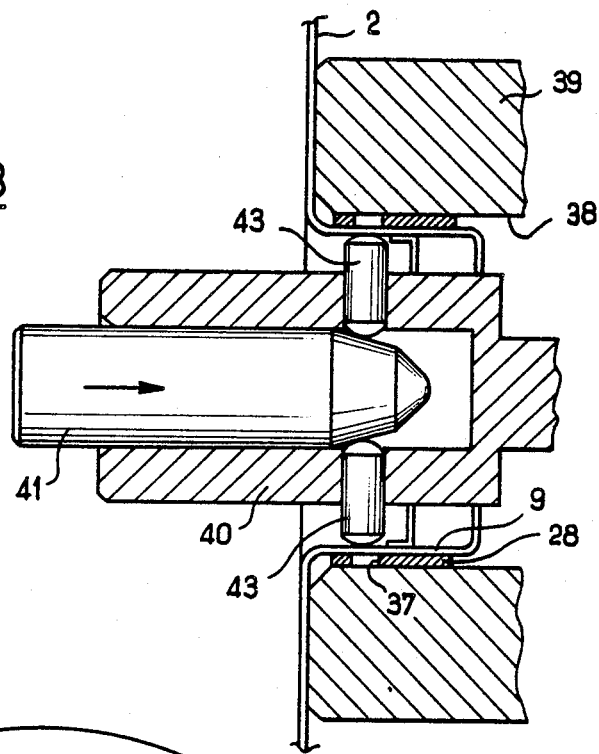
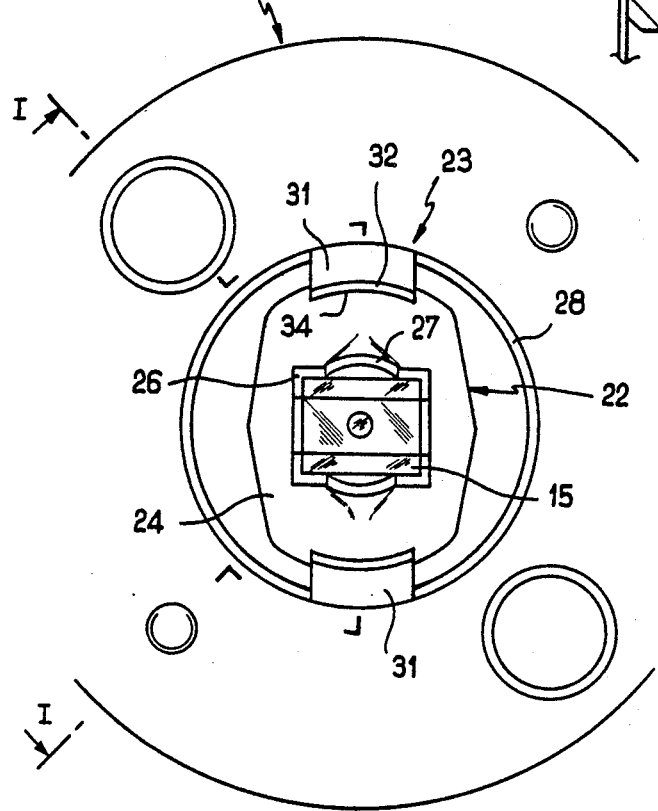

PNEUMATIC BRAKE BOOSTER

The present invention relates to pneumatic brake boosters for vehicles, of the type comprising, inside a housing, a booster piston means biased axially by a piston return spring and comprising a rear hub part inside which there are arranged an elastic valve means and a valve plunger coupled to a booster actuating rod which is intended typically to be connected to a vehicle brake pedal and is axially biased by a rod return spring coaxial with the actuating rod, a retaining key mounted in the rear hub part and co-operating selectively with the valve plunger, and a stop member secured to the housing and forming a return abutment for an abutting member integral with the actuating rod.

A booster of this type is described in JP-U-35,661/78. In this document, the stop member consists of an annular plate integral with a cylindrical cover mounted on the housing and co-operating with a shoulder formed as a single piece with the actuating rod. This arrangement, in addition to not allowing precise adjustment of the operational dead travel, also does not allow the requirements imposed by some motor-vehicle manufacturers to be met, including, in particular, a so-called "chunking" test during which a very large pulling force (of the order of 500 daN) is exerted on the actuating rod.

It is therefore an object of the invention to provide a booster of the abovementioned type, which has a robust design and involves low manufacturing costs suitable for mass production and which is able to satisfy the most stringent tests, in addition to offering the possibility of finely adjusting the end of the operational dead travel.

For this purpose, according to a feature of the invention, the stop member has a deformable structure capable of yielding elastically when a force exerted axially by the abutment member on the stop member exceeds a predetermined value.

According to another feature of the invention, the abutment member is fixed, typically crimped, after pre-assembly of the booster, in a given position to a fork for coupling the input rod to the brake pedal.

With such an arrangement, the stop member fulfills, under normal operating conditions or during less demanding tests, for example for adjusting the stop contact, its function of retaining the abutting member in abutment so as to limit the operational dead travel which, moreover, may be finely adjusted by the manner in which the abutting member and the actuating rod are fixed together, the stop member, however, being capable of yielding elastically during the chunking tests, thereby avoiding damage or the need for improper overdimensioning of the stop member, which subsequently resumes, for the duration of the booster's life, the required relative position in relation to the abutting member.

The invention will now be described by way of example with reference to the accompanying drawings in which:

FIG. 2 is a rear view of the central part of the booster shown in FIG. 1;

FIG. 3 illustrates, in diagrammatic form, the method of fixing, by means of crimping, the housing duct to the stop member;

In the following description, the terms "front" and "rear" refer to the usual arrangement of a booster installed in a vehicle.

Figure 1:
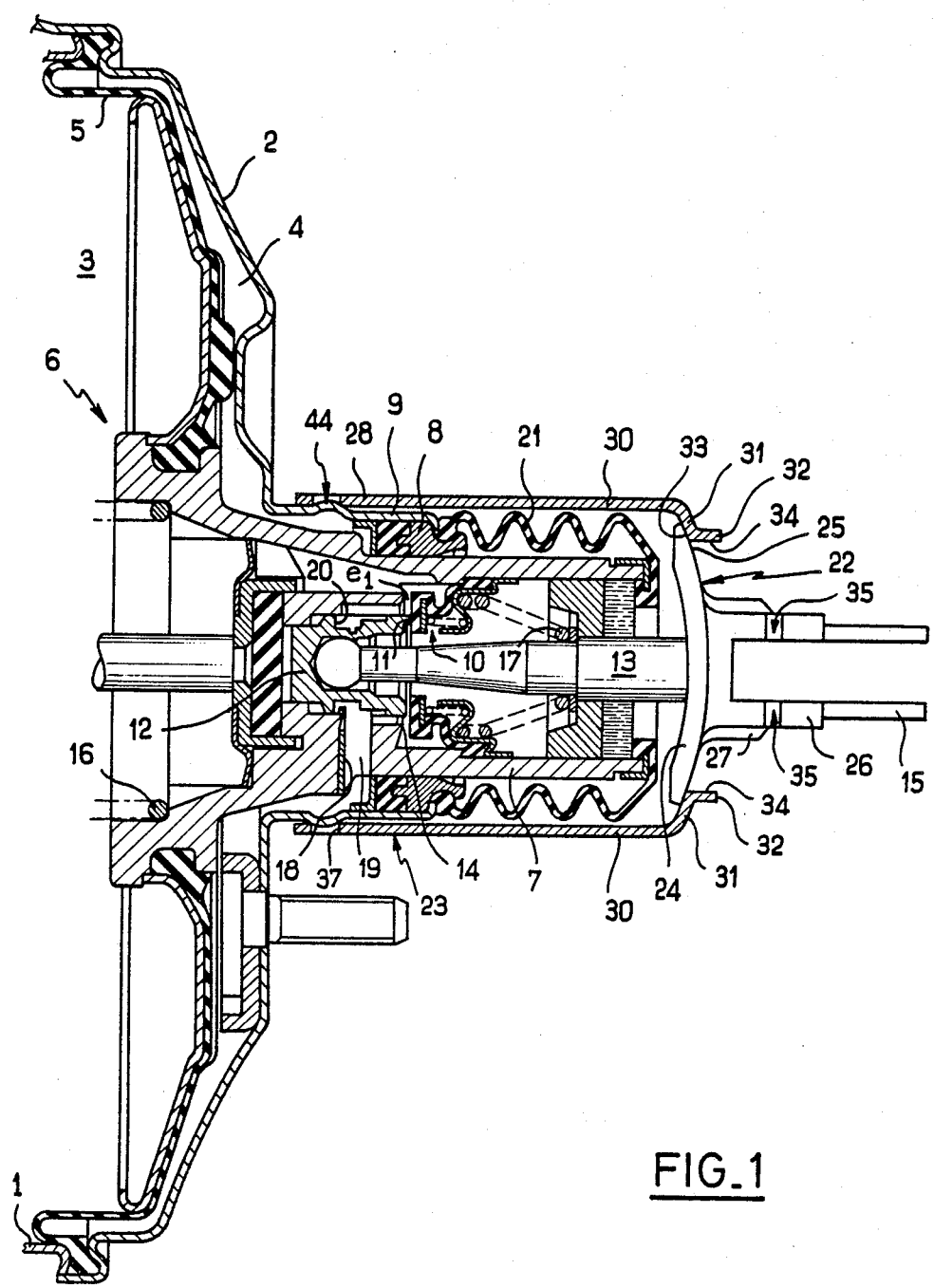
FIG. 1 is a view, in partial longitudinal section, along the sectional planes I—I shown in FIG. 2, of the rear part of a pneumatic booster according to the invention.

FIG. 1 shows a pneumatic brake booster of the type comprising a housing consisting of the peripheral assembly of a front housing shell 1 and a rear housing shell 2, the housing being divided internally into a front vacuum chamber 3, intended to be permanently connected to a vacuum source (not shown) in a vehicle, and a rear working chamber 4, by a booster piston means consisting typically of an annular diaphragm 5 mounted centrally on a piston hub indicated generally by the reference number 6 and having a tubular rear hub part 7 sealingly and slideably guided by a guiding and sealing assembly 8 inside a rear central duct 9 formed typically as a single piece with the rear housing shell 2. Selective communication between the rear working chamber 4 and the front vacuum chamber 3 or with the atmosphere prevailing in the rear internal zone of the rear hub part 7 is achieved by a resilient valve means, indicated generally by the reference number 10, which is mounted in the rear hub part 7 and co-operates selectively with a first valve seat 11 formed at the rear end of a valve plunger 12 slideably mounted in a central bore of the hub 6 and coupled to the booster actuating rod 13, and with a second valve seat 14 formed in the hub 6 concentrically around the valve plunger 12. Typically, the input rod 13 is rigidly fixed, at its rear end, to a U-shaped fork 15 for coupling to a vehicle brake pedal (not shown). The piston means 5, 6 is axially biased in the direction of the rear housing shell 2 by a piston return spring 16 arranged inside the front vacuum chamber 3, and the actuating rod 13 is axially biased towards the rear by a rod return spring 17 resting inside the rear hub part 7 (typically on the valve support of the valve means 10) and on a shoulder or a collar mounted on the actuating rod 13. The possibility of retracting the plunger 12 relative to the hub 6 after a braking phase (i.e. when the piston means 5, 6 has moved forwards), causing the resilient valve means 10 to open excessively away from the second seat 14 when returning, is limited by a stop key 18 mounted in a radial recess 19 formed in the hub 6 (and forming an air passage to the rear working chamber 4) and extending inside the central bore of the hub where the plunger 12 slides so as to co-operate selectively with a peripheral shoulder 20 of the plunger 12. The external sliding surface of the rear hub part 7 is typically protected by a bellows 21 arranged between the rear end of this part of the rear hub 7 and the rear end of the duct 9.

According to the invention, the rest position of the plunger 12 in relation to the hub 6 (in abutment, in this rest position, as shown in FIG. 1, against the rear housing shell 2) and, therefore, the dead travel play $e_1$ between the front face of the resilient valve means 10 (biased towards the rear by the plunger 12) and the second valve seat 14, is determined by means of an abutting member 22 mounted on the actuating rod 13 and co-operating with a stationary stop member, indicated generally by the reference number 23, which is integral with the housing, typically the rear housing shell 2.

Figure 5:
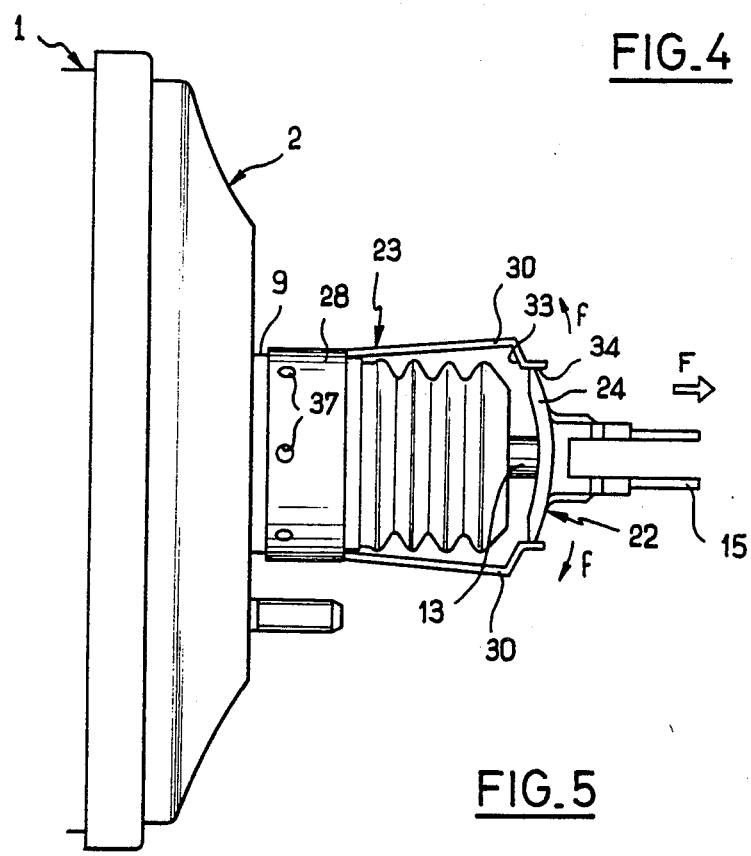
FIG. 5 is a plan view illustrating the way in which the stop member of the booster according to the invention yields.

According to the invention, the abutting member, which is made of metal, has a collar part 24 extending substantially radially outwards and having a substantially spherical rear surface 25, which is centered about the center of the ball joint for coupling the rod 13 to the plunger 12, and a prismatic mounting base 26 fixed onto the U-shaped fork 15 and advantageously strengthened by stiffening ribs 27. In the embodiment shown, the stop member 23, which is made of sheet metal, has an annular mounting sleeve 28, which is fitted onto the duct 9 and rigidly fixed to the latter, and two diametrically opposite longitudinal arms 30 extending normally and axially parallel towards the rear and each having, in the vicinity of their rear end, a part 31 folded radially inwards and towards the rear, itself extended towards the rear by a lug 32 extending substantially axially. As can be seen clearly in FIG. 1, it is understood that the parts 31 of the ends of the arms 30, which extend inwards, have an internal surface 33 which lies on the axial path of the periphery of the collar 24 of the abutting member 22, thus forming, together with the convex rear surface 25 of the collar 24, co-operating bearing surfaces which are inclined towards the rear in relation to the axis of the actuating rod 13. Consequently, although normally ensuring that the abutting member 22 (and, therefore, the actuating rod 13 and the plunger 12) are precisely held in abutment, if a considerable pulling force, as indicated by the arrow F in FIG. 5, is exerted on the fork 15, the slightly curved profile of the bearing surfaces 25 and 33 allows the periphery of the collar 24 to slide relative to the bearing surface 33, thereby causing the arms 30 to bend elastically and expand outwards, as indicated by the arrows f in FIG. 5. If the momentary force F is very large, as in the case of chunking tests, this outwards bending of the arms 30 causes the periphery of the collar 24 to be engaged between the opposite guiding and holding surfaces 34 of the end lugs 32 of the arms 30, once more holding the latter in their position of maximum separation. During this escapement phase, the backward movement of the rod 13/plunger 12 assembly is limited by the shoulder 20 of the plunger 12 coming into abutment against the stop key 18, itself kept stationary on account of the previously abutting position of the hub 6 against the rear shell of the housing 2. The axial length of the end lugs 32 is determined so that, when the abutting member 22 is in the maximum retracted position, the periphery of the collar 24 does not protrude beyond the free ends of the lugs. Once the chunking test has been completed, the rod 13 is brought forwards again into its normal rest position, the collar 24 passing axially again along the bearing surfaces 33 of the arms 30 which then elastically resume their normal position, thus holding the assembly consisting of the abutting member 22, rod 13 and plunger 12 in the required rest position.

According to a feature of the invention, this required rest position is adjusted precisely by rigidly fixing the abutting memper 22 to the fork 15 in a suitable given position. During the assembly of the booster, the abutting member 22 is positioned freely on the fork 15. At this stage, taking into account the observations according to which, owing to the series of tolerances, the usual dead travel of the valve means is between approximately 1.1 and 1.35 millimeters, the rod 13 is moved forward by a given amount, typically 1 mm, relative to the hub 6 held in abutment against the rear housing shell 2 by the piston spring 16, as indicated by the arrow A in FIG. 4, in order to ensure a dead travel play $e_1$ which is less than 0.4 mm. With the rod 13 thus advanced in this position, the abutting member 22 is pushed towards the rear against the bearing surfaces 33 of the arms 30, as indicated by the arrows b in FIG. 4, and the prismatic base 26 is then rigidly fixed to the fork 15 by crimping the corresponding U-shaped walls of the base 26 in notches 35 provided in the edges of the fork 15 by means of punches 36, after which the rod 13/plunger 12 assembly thus retains the relative "advanced" position, thereby ensuring the abovementioned reduced dead-travel play $e_1$.

Figure 4:
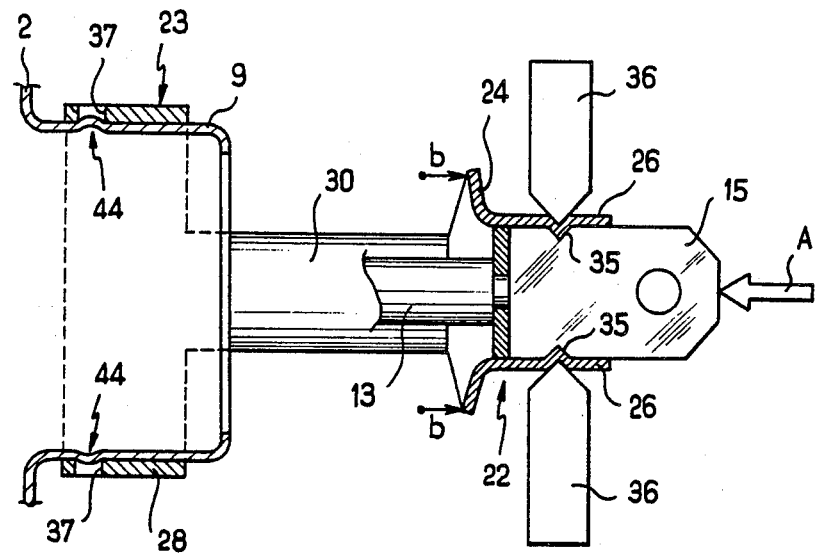
FIG. 4 illustrates, in diagrammatic form, fixing of the abutting member in the required position on the fork of the actuating rod.

As can be clearly seen in FIGS. 3 and 4, in a preferred embodiment of the invention, the annular mounting sleeve 28 of the stop member 23 has a series of orifices 37 located at angular intervals. Before assembly of the booster, the duct 9 together with the sleeve 28 fitted onto it is inserted in a bore 38, with corresponding dimensions, of a tool 39 into which a hollow mandrel 40 is introduced and positioned, the mandrel having a plunger 41 with, at the front, a conical ramp 42 capable of pushing crimping pins 43 radially outwards in order to press the material of the wall of the duct 9 into the orifices 37, as indicated at 44, and thus firmly fix the stop member 23 to the duct 9 in the required position.

Although the present invention has been described in relation to a particular embodiment, it is not limited thereto, but, on the contrary, may be subject to modifications and variations which appear necessary to a person skilled in the art.

We claim:

1. A pneumatic brake booster for a vehicle, comprising, inside a housing, a booster piston biased axially by a piston return spring and comprising a rear hub part inside which is arranged resilient valve means and a valve plunger coupled to a booster actuating rod biased axially by a rod return spring coaxial with said rod, a retaining key mounted in said rear hub part and cooperating selectively with said valve plunger, and a stop member secured to said housing and forming a return abutment for an abutting member connected with said actuating rod, characterized in that said return abutment includes a deformable structure which yields elastically when a force exerted axially by said abutting member on said return abutment exceeds a predetermined value, and the deformable structure returning to an initial resilient position when the abutting member returns to an at-rest position, said abutting member and said return abutment having cooperating bearing surfaces which are inclined toward a rear of the booster and relative to an axis of said acutating rod, and said bearing surface of said return abutment is extended away from the booster by a substantially axial guiding surface, and said abutting member is fixed rigidly, in a given position, to a U-shaped coupling fork secured to the actuating rod.

2. The booster according to claim 1, characterized in that said abutting member has a collar part and a prismatic base fitted onto said fork.

3. The booster according to claim 2, characterized in that said prismatic base is crimped into position in notches provided on edges of said fork.

4. The booster according to claim 1, characterized in that the bearing surface of said return abutment is formed by a rear end of at least one longitudinal arm having a front end fixed rigidly to said housing.

5. The booster according to claim 4, characterized in that said arm is formed as a single piece with an annular mounting sleeve fixed rigidly to a rear central duct of said housing.

6. The booster according to claim 5, characterized in that said mounting sleeve and said duct are fixed rigidly to each other by crimping.

7. The booster according to claim 1, characterized in that the deformable structure comprises a radially expandable portion of the stop member.

8. The booster according to claim 7, characterized in that the return abutment and radially expandable portion are integral with the stop member.

* * * * *